United States Patent [19]

Coffey et al.

[11] Patent Number: 4,603,192

[45] Date of Patent: Jul. 29, 1986

[54] PROCESS FOR THE MANUFACTURE OF SPINNABLE POLYAMIDES UTILIZING A MIXTURE OF AN OXYGENATED PHOSPHORUS COMPOUND AND AN OXYGENATED BORON COMPOUND AS CATALYST

[75] Inventors: Gerald P. Coffey, Lyndhurst; Robert S. Sherrard, Jr., Brecksville; Benedict S. Curatolo, Maple Heights; Robert C. Sentman, Macedonia, all of Ohio

[73] Assignee: The Standard Oil Company, Cleveland, Ohio

[21] Appl. No.: 690,296

[22] Filed: Jan. 10, 1985

[51] Int. Cl.$^4$ ............................................. C08G 69/28
[52] U.S. Cl. .................................. 528/336; 528/312; 528/313; 528/319; 528/335
[58] Field of Search ................ 528/336, 313, 319, 312

[56] References Cited

U.S. PATENT DOCUMENTS 4,436,898  3/1984  Hofmann et al. .................. 528/336

*Primary Examiner*—Harold D. Anderson
*Attorney, Agent, or Firm*—David P. Yusko; John E. Miller; Larry W. Evans

[57] ABSTRACT

The process for manufacturing a nylon-type polyamide from a dinitrile, a diamine and water in the presence of a catalyst is improved by using as a catalyst an oxygenated phosphorus compound and an oxygenated boron compound. For example, high quality nylon-6,6 is manufactured by contacting adiponitrile, hexamethylene diamine and water with boric acid and phosphorous acid at an elevated temperature and pressure.

17 Claims, No Drawings

PROCESS FOR THE MANUFACTURE OF SPINNABLE POLYAMIDES UTILIZING A MIXTURE OF AN OXYGENATED PHOSPHORUS COMPOUND AND AN OXYGENATED BORON COMPOUND AS CATALYST

FIELD OF THE INVENTION

This invention relates to polyamides. In one aspect, the invention relates to a process for manufacturing spinnable polyamides from an $\alpha,\omega$-dinitrile and $\alpha,\omega$-diamine while in another aspect, the invention relates to a process utilizing a mixture of an oxygenated phosphorus compound and an oxygenated boron compound as a catalyst. In still another aspect, the invention relates to an improved process for manufacturing nylon-6,6 from adiponitrile and hexamethylenediamine utilizing a catalyst system composed of a mixture of an oxygenated phosphorus compound and an oxygenated boron compound.

DESCRIPTION OF THE PRIOR ART

The art is replete with references describing various methods for preparing commercially available nylons from diamines and dicarboxylic acids. The art also contains teachings for preparing nylons from diamines and dinitriles. For example, U.S. Pat. No. 2,245,129 by Greenwalt describes a method for producing a linear polyamide by heating a reaction mixture of a dinitrile, a diamine and water. The procedure consists of two stages. In the first stage the reaction mixture is heated in a closed reaction vessel until a low molecular weight polyamide is formed while in the second stage, this low molecular weight polyamide is converted to a high molecular weight polyamide upon additional heating.

U.S. Pat. No. 3,847,876 by Onsager teaches another method for preparing a high molecular weight polyamide comprising contacting a dinitrile, a diamine and water. The Onsager process requires at least equal molar amounts of diamine and dinitrile to be initially present in the reaction mixture and further requires that the polymerization occur in the presence of controlled amounts of ammonia, preferably in the presence of at least three weight percent based on the total weight of the diamine, dinitrile and water. This generally entails addition of ammonia to the reaction mixture over the course of the reaction.

Hoffman et al., U.S. Pat. No. 4,436,898, disclose an improved method for preparing a high molecular weight polyamide from a dinitrile, diamine and water by conducting the polymerization in the presence of an oxygenated phosphorus compound, such as phosphoric acid. This process reduces the conventional reaction time of the polymerization and produces a high molecular weight, linear polyamide.

Recently Coffey et al., U.S. application Ser. No. 540,596, now U.S. Pat No. 4,490,521, disclose a method for the improvement of resin thermal stability through the use of metal salts of oxyphosphorus acids, such as disodium phosphite, as the catalyst. Even more recently, Coffey et al., U.S. application Ser. No. 651,144 filed Sept. 17, 1984, disclose an improved catalyst system comprising an oxygenated phosphorus compound and a molybdenum compound.

While all of the above methods and others known in the art demonstrate utility for manufacturing linear polyamides, the nylon fiber industry continues to seek manufacturing improvements which result in superior quality polyamide. Of particular interest are process improvements which will result not only in reduced operation cost and the corresponding increase in operation efficiency, but which will also result in a spinnable polyamide that will have superior weight loss properties.

SUMMARY

According to this invention, the process for manufacturing a solid polyamide, suitable for fiber spinning, from an $\alpha,\omega$-dinitrile, an $\alpha,\omega$-diamine and water in contact with a catalyst and at an elevated temperature and pressure, is improved by employing as the catalyst a mixture of an oxygenated phosphorus compound and an oxygenated boron compound. The polymer produced by this process in a given time has improved thermal stability and is of comparable or higher molecular weight than that produced using an equivalent concentration of either component of the catalyst mixture alone.

DETAILED DESCRIPTION OF THE INVENTION

Monomers

The $\alpha,\omega$-diamines here used are of the formula

$$R'HN—R—NHR' \qquad (I)$$

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic or aromatic radical and each one of these radicals can also bear one or more inert substituents. By the term "inert" is meant that the substituent is essentially nonreactive with the reactants, catalysts and products of the process under process consitions. Typically, R is a divalent $C_1$–$C_{20}$ aliphatic radical, a divalent $C_5$–$C_{18}$ alicyclic radical or a divalent benzene radical and preferably R is a $C_2$–$C_8$ straight chain alkylene radical. Typically, R' is hydrogen or a $C_1$–$C_{20}$ aliphatic radical, $C_5$–$C_7$ alicyclic or a phenyl radical. Preferably, R' is hydrogen or a $C_1$–$C_4$ alkyl radical. Representative diamines include tetramethylene diamine, hexamethylene diamine, p-diaminodicyclohexylmethane, 4,4'-diaminodicyclohexyl ether, 4,4'-diaminodicyclohexyl sulfide, 4,4'-diaminodicyclohexyl sulfone, octamethylene diamine, decamethylene diamine, dodecamethylene diamine, 1,4-dimethyleneamino-1-phenyl-1,2,3,4-tetrahydronaphthalene, m-xylylenediamine and the like. Hexamethylene diamine is an especially preferred diamine.

The dinitriles here used are of the formula

$$NC—R—CN \qquad (II)$$

where R is as previously defined. Representatives dinitriles include glutaronitrile, succinonitrile, adiponitrile, suberonitrile, sebaconitrile, 1,10-decane dinitrile, methyl glutaronitrile, $\alpha$-methylene glutaronitrile, 1,4-dicyano-1-phenyl-1,2,3,4-tetrahydronaphthalene, 1,3-dicyanobenzene, 1,4-dicyanobenzene and the like. Adiponitrile is an especially preferred nitrile.

The instant invention is substantially aimed at the production of nylon-type polyamides from diamines and dinitriles. However, other nylon-type polyamides can also be prepared by the instant process by the polymerization of a major proportion of diamines and dinitriles with a minor proportion of other polyamide forming compounds. Representative of other polyamide forming compounds are lactams such as caprolactam, valerolactam, undecalactam and laurolactam; amino carboxylic acids; aliphatic and aromatic dicarboxylic acids, such as adipic acid and succinic acid; and aliphatic and aromatic diamides, such as adipamide, sebacamide and the like.

The Catalyst

The hallmark of this invention is the use of a two component catalyst system consisting of an oxygenated phosphorus compound and an oxygenated boron compound. This mixture is a more efficient catalyst, with regard to polymer thermal stability, than either component used alone.

The oxygenated phosphorus compounds suitable for use as catalysts in the invention include phosphorous acid; phosphonic acid, alkyl and aryl substituted phosphonic acid, hypophosphorous acid, alkyl, aryl and alkyl/aryl substituted phosphinic acid; and phosphoric acid; as well as the alkyl, aryl and alkyl/aryl esters, metal salts, ammonium salts, and ammonium alkyl salts of these various phosphorus containing acids. As used herein, "alkyl/aryl" refers to those combinations where there is more than one organic substituent. In the substituted acids, the alkyl or aryl group replaces the hydrogen connected directly to the phosphorus atom. The esters are formed conventionally with the alkyl or aryl group replacing the hydrogen of an —OH group comprising the acid. To clarify the nomenclature, the names of the acids are identified with the structural formulas as follows:

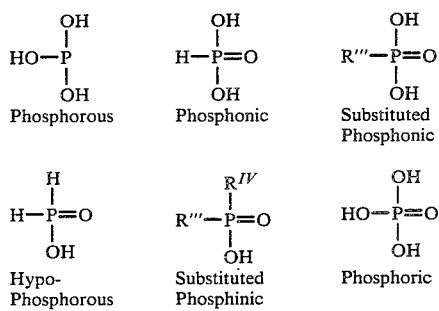

where R''' is an alkyl or aryl or alkyl/aryl group and $R^{IV}$ is hydrogen or an alkyl or aryl group. In common usage, phosphonic acid shares the name phosphorous acid.

Preferred oxygenated phosphorus compounds are phosphorous acid, phosphoric acid, and the sodium, lithium or sodium/lithium dibasic salts of phosphorous or phosphoric acids. These salts may be added initially or generated in situ by the addition of NaOH or LiOH to a reaction mixture already containing the oxyphosphorus acid or a monobasic salt thereof at a time late in the reaction cycle. Also preferred are the salts of any of the previously disclosed phosphorus containing acids which are the results of combining any cation with the acid to form a salt. Preferred cations for this purpose are univalent metals and ammonium.

Preferred oxygenated boron compounds include boric acid, boric anhydride, salts of boric acid or boron anhydrides, and esters of boric acid.

Sufficient catalyst is employed to promote the polymerization of the diamine and dinitrile with a typical amount of between 0.001 and 1 weight percent, based upon the total weight of the diamine, dinitrile, and water. Catalyst levels of about 0.01 to about 1 weight percent are preferred.

Many mole ratios of phosphorus to boron will produce the desired results. Preferred mole ratios are those indicating an excess of boron such as a phosphorus to boron ration less than 1:2. More preferred are those ratios less than 1:3. Most preferred are phosphorus to boron ratios between 1:4 and 1:8.

The manner in which the catalyst is added to the monomers can vary, e.g. addition of each component separately to a mixture of monomers or added as a mixture to one of the monomers prior to admixture with the other monomer.

While not being bound to theory, it is believed that the oxygenated boron compound acts to "tie up" acidity of the oxygenated phosphorus compound in the produced polyamide, leading to better thermal stability.

Process Parameters

High molecular weight, linear polyamides having desirable weight loss properties are prepared by forming a reaction mixture of the dinitrile, diamine, water and catalyst. This reaction mixture can be formed by anyone of a number of different methods. One method is the gradual addition, either continuously or incrementally, of the diamine to the dinitrile over the course of the hydrolysis portion of the reaction (polymerization). Typically, in this method less than 50 mole percent of the diamine, preferably less than 5 mole percent, is admixed with the dinitrile with the remainder of the diamine added gradually over the course of polymerization. Another method and one preferred due to its simplicity of operation is a batch addition of all reactants at the commencement of the reaction.

The reaction itself is preferably conducted in a batch mode. However, the reaction can also be conducted in a continous mode, i.e. continual addition of the reactants with concomitant removal of product, if desired. An example of a continous mode process is the use of a cascade reactor arrangement.

Water is necessary to the process as both a reactant and as an aid in formation of the polyamide. Consequently, usually an excess of water is present in the reaction mixture over at least a part of the polymerization but preferably the initial water content of the reaction mixture does not exceed about 25 weight percent of the total weight of the reaction mixture, more preferably it does not exceed 15 weight percent. Assuming less than or about 15 weight percent is present at the start of the reaction, then as the polymerization proceeds additional water is gradually added to the reaction mixture until water constitutes about 20 weight percent of the mixture. Although it is not desired, more water can be used. However, since the water will have to be removed from the reaction product at the end of the polymerization, preferably the amount of excess water is kept to a minimum (20 weight percent or less) to facilitate ultimate removal. Moreover, the less water present during the polymerization generally means the less energy needed for the process and consequently, less expensive process equipment can be employed. The manner in which the water is initially introduced into the reaction mixture is not important to the pratice of this invention and it can thus be either added alone or in combination with the dinitrile or diamine.

Ammonia is a byproduct of the reaction of the diamine, dinitrile and water. As a consequence, ammonia is constantly being generated within the reaction mixture but it typically enters the vapor phase and is preferably continuously removed from reaction zone (e.g. released through a pressure relief valve on the reaction vessel). The concentration of ammonia in the reaction mixture (which is a liquid) can vary from threshhold detection limits up to about 5 weight percent of the total weight of the reaction mixture. Preferably, the concentration of ammonia in the liquid reaction mixture does not exceed 1 weight percent and more preferably, is kept as low as possible.

In one embodiment of this invention, high quality nylon-6,6 resin is prepared from adiponitrile, hexamethylene diamine and water by continuously removing substantially all of the ammonia generated during the polymerization but while retaining all of the water. The water is eventually removed from the reaction system after the low molecular weight polyamides are formed, i.e. the hydrolysis of the dinitrile is essentially complete as evidenced, for example, by the amount of ammonia that has evolved since the start of the reaction.

As is well known in the art, e.g. U.S. Pat No. 3,847,876, the polymerization of a diamine and a dinitrile to form a high molecular weight, linear polyamide is best conducted over a temperature/pressure profile that varies over the course of the polymerization. The temperature/pressure profile will, of course, vary with the specific reactants employed as well as with such factors as the nature and amount of catalysts, mode of operation (batch versus continous), configuration of the reaction vessel, etc. For the manufacture of nylon-6,6 from adiponitrile, hexamethylene diamine and water, a temperature/pressure profile comprising at least two stages is typically employed, both preferably conducted in the absence of air ($O_2$). During the first stage of the polymerization, the temperature is maintained at 180°-300° C. under autogenous pressure (typically about 200 to about 800 psi absolute) for a period of time sufficient to form low molecular weight polyamides, e.g. polyamides having a weight average molecular weight of less than about 10,000, generally less than about 5,000 as measured by instrinsic viscosity. Ammonia is removed from the reaction vessel while maintaining the water concentration at a level sufficient for polymerization to proceed, typically in excess of 14 weight percent. At the completion of the first stage (which is the start of the second stage), the pressure is gradually reduced to atmospheric or subatmospheric pressure and the temperature is gradually increased, preferably to between about 260°-295° C. During this second stage, relatively low molecular weight polyamides are combined to form the high molecualr weight polyamides that constitute the final product of the process. The second stage is typically concluded with a sweep or purge of the reaction vessel with a flow of inert gas, such as nitrogen.

In one embodiment of this invention, the molecular weight of the polyamide can be increased by performing the polymerization at a temperature just below the lowest temperature at which either the catalyst, monomers or final polyamide begin to degrade.

Although the polymerization is initially conducted at autogenous pressure with a later reduction to atmospheric or subatmospheric pressure, the process can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

The Polyamide

The polyamides produced by this invention have a nylon structure, i.e. amide linkages (CONH) as part of the polymer backbone, as opposed to polyacrylamides which have an essentially all carbon backbone. These polyamides can be used in any application calling for a nylon-type polymer. For example, these polyamides can be used as fibers, plastics, films and molding compounds.

The polyamides produced by this invention have relatively high molecular weight and are characterized by having relatively high onset decomposition temperatures (ODT). This property is directly related to the stability of the polymer, the higher the ODT, the more thermally stable the polyamide. Typically, the polyamides produced by this invention have an ODT higher than about 330° C. which is of economic value in the marketplace since such polyamides will undergo less thermal degradation during processing. For example, fiber spinning appartus will require less down time for cleaning when processing a relatively high ODT polyamide than when processing a lower ODT polyamide.

In addition, thermal gravimetric analysis (TGA) shows that the polyamides made by this invention have relatively low weight loss. Although not completely understood at this time, the polyamides produced by this invention are believed to have very desirable thermal stability characteristics because they contain few, if any defect structures. A defect structure is simply a branch or side chain attached to the polymer backbone which is formed when a monomer, oligomer or low molecular weight polymer attaches to the polymer backbone as a pendent substituent rather than as an intergal part of the backbone itself. Although these defect structures may be present in relatively low concentrations, even in extremely low concentrations, even parts per million, their presence can confer undesirable thermal instability to the polyamide. The practice of this invention reduces the formation of defect structures in the polyamide to a minimum.

This invention is particularly well adapted to manufacturing high quality nylon-6,6 polymer from adiponitrile, hexamethylene diamine, catalyst and water. However, this invention is also useful for the manufacture of nylon-4,4; nylon-4,6; and nylon-6,4 (from the appropriate dinitriles and diamines).

The following examples are illustrative of various embodiments of this invention. Unless noted to the contrary, all parts and percentages are by weight.

SPECIFIC EMBODIMENTS

Controls 1–5, Examples 6–12

All the controls and examples were run in a Parr autoclave (450 ml) equipped with an anchor agitator. The reactor was charged with adiponitrile (54.07 g, 0.5 moles). hexamethylenediamine (58.15 g, 0.5004 moles), water (33.51 g) and catalyst. The reactor was then purged with nitrogen, sealed and connected to a back-pressure regulator adjusted to 750 psi absolute. The reaction mixture was then heated with stirring to 260° C. and the reaction was allowed to proceed at this temperature 3½ hours. The pressure within the reaction vessel was then reduced to atmospheric pressure over 30 minutes while the temperature was maintained at about 260° C. The reactor was then swept with nitrogen for 15 minutes and subsequently cooled to room temperature under a positive nitrogen pressure. Nylon-6,6 polymer was recovered from the reactor and ground to a size such that it would pass through a ten mesh (U.S. Standard) screen. Melting point and onset decomposition temperature (ODT) were measured by differential scanning calorimetry (DSC). Weight loss was measured by thermal gravimetric analysis (TGA). Intrinsic viscosity was determined in formic acid (90 weight percent) at 25° C. Bulk viscosity was the time required for 0.415 g of polymer dissolved in 2 ml of 90 percent formic acid to traverse 0.8 ml in a 1 ml pipette at room temperature.

Identification of the catalysts and the results are reported in Table I.

TABLE I

NYLON-6,6 PREPARATION FROM ADIPONITRILE, HEXAMETHYLENEDIAMINE AND WATER WITH H3PO3/H3BO3 CATALYSTS

| Example Number | CAT A | CAT B | CONC. CAT A Mole % | CONC. CAT B Mole % | CAT Ratio A:B | Bulk Viscosity (Seconds) | Intrinsic Viscosity (DL/G) | TGA WT Loss (%) 325-390 C. | DSC Onset Decomp Temp (Degrees C.) |
|---|---|---|---|---|---|---|---|---|---|
| C-1 |   |   |   |   |   | 6.09 | 0.49 | 2.4 | 335 |
| C-2 | H3PO3 |   | 0.1460 |   |   | 33.80 | 1.23 | 9.0 | 318 |
| C-3 |   | H3BO3 |   | 0.1460 |   | 15.44 | 0.81 | 5.1 | 350 |
| C-4 | H3PO3 |   | 0.0584 |   |   | 13.36 | 0.75 | 6.9 | 325 |
| C-5 | H3PO3 |   | 0.0292 |   |   | 12.21 | 0.72 | 6.2 | 330 |
| 6 | H3PO3 | H3BO3 | 0.0730 | 0.2920 | 1 to 4 | 19.40 | 0.93 | 4.3 | 355 |
| 7 | H3PO3 | H3BO3 | 0.0584 | 0.2340 | 1 to 4 | 20.65 | 0.92 | 4.2 | 357 |
| 8 | H3PO3 | H3BO3 | 0.0584 | 0.4680 | 1 to 8 | 22.26 | 0.97 | 4.6 | 350 |
| 9 | H3PO3 | H3BO3 | 0.0292 | 0.1168 | 1 to 4 | 19.38 | 0.93 | 3.0 | 343 |
| 10 | H3PO3 | H3BO3 | 0.0209 | 0.1250 | 1 to 6 | 26.10 | 1.00 | 3.6 | 340 |
| 11 | H3PO3 | H3BO3 | 0.0964 | 0.0482 | 2 to 1 | 50.00 | 1.51 | 9.2 | 320 |
| 12 | H3PO3 | H3BO3 | 0.0487 | 0.0973 | 1 to 2 | 40.00 | 1.21 | 8.1 | 345 |

Examples 6–10 clearly show greater thermal stability as indicated by the onset decomposition temperature in the resulting polymer than Controls 1–5 where no catalyst or only one of the catalyst components was employed. Examples 11 and 12 are offered as counter examples to illustrate the desirability of a phosphorus to boron ratio of less than 1:2. In counter examples 11 and 12 the phosphorus to boron ratio was 1:2 or greater. At these ratios, the resulting polyamides exhibited increased molecular weight as evidenced by the intrinsic viscosity but also exhibited poor thermal stability as evidenced by the greater TGA weight loss as compared to Examples 6–10 where phosphorus to boron ratios of less than 1:2 were employed.

Although the invention has been described in considerable detail through the preceding examples, these examples are for the purpose of illustration only, and one skilled in the art will understand that variations and modifications can be made without departing from the spirit and scope of the invention.

The claimed invention is:

1. In a process for the manufacture of a solid polyamide, the process comprising contacting an α,ω-dinitrile, and α,ω-diamine, water and a catalyst at an elevated temperature and pressure, the improvement comprising using as the catalyst an oxygenated phosphorus compound and an oxygenated boron compound.

2. The process of claim 1 where the oxygenated phosphorus compound is selected from the group consisting of phosphorous acid; phosphonic acid; alkyl or aryl substituted phosphonic acid; hypophosphorous acid, alkyl, aryl or alkyl/aryl substituted phosphinic acid; phosphoric acid; the alkyl, aryl or alkyl/aryl esters of phosphorous acid, phosphonic acid, phosphinic acid, phosphoric acid, or alkyl or aryl substituted phosphonic or phosphinic acids; and the metal salts, ammonium salts or ammonium alkyl salts of phosphorous acid, phosphonic acid, phosphinic acid, phosphoric acid, or alkyl or aryl substituted phosphonic or phosphinic acids.

3. The process of claim 2 where the oxygenated phosphorus compound is a metal salt of an oxygenated phosphorus compound.

4. The process of claim 3 where the metal salt of an oxygenated phosphorus compound is an alkali metal salt of an oxygenated phosphorus compound.

5. The process of claim 4 where the metal salt of an oxygenated phosphorus compound is an alkali metal salt of at least one of phosphorous acid or phosphoric acid.

6. The process of claim 1 where the oxygenated boron compound is selected from the group consisting of boric acid, boric anhydride, salts of boric acid, salts of boron anhydride, and esters of boric acid.

7. The process of claim 1 where the oxygenated boron compound is boric acid.

8. The process of claim 1 where the ratio of phosphorus to boron in the catalyst is less than about 1:2.

9. The process of claim 8 where the ratio of the phosphorus to boron in the catalyst is less than about 1:3.

10. The process of claim 9 where the ratio of the phosphorus to boron in the catalyst is between about 1:4 and 1:8.

11. The process of claim 1 where the catalyst is present in an amount between about 0.001 to about 1 weight percent based upon the total weight of the diamine, dinitrile and water.

12. The process of claim 1 where the diamine is of the formula $$R'HN-R-NHR' \qquad (I)$$

and where the dinitrile is of the formula $$NC-R-CN \qquad (II)$$

where R is a divalent organic radical and each R' is independently hydrogen or a univalent organic radical.

13. The process of claim 12 where R is a divalent $C_1$-$C_{20}$ aliphatic, divalent $C_5$-$C_{18}$ alicyclic or divalent benzene radical and each R' is independently hydrogen, a univalent $C_1$–$C_{20}$ aliphatic, univalent $C_5$–$C_7$ alicyclic or a phenyl radical.

14. The process of claim 13 where R is a $C_2$–$C_8$ straight chain alkalene radical and R' is hydrogen or a $C_1$–$C_4$ alkyl radical.

15. The process of claim 14 where the diamine is hexamethylene diamine and the dinitrile is adiponitrile.

16. The process of claim 1 where the polyamide is of the type used for fiber, plastics, films or molding compounds.

17. The process of claim 1, wherein an $\alpha,107$-dinitrile, and $\alpha,\omega$-diamine and water are polymerized with other polyamide forming compounds selected from the group consisting of lactams, amino carboxylic acids, aliphatic and aromatic dicarboxylic acids, and aliphatic and aromatic diamides.

* * * * *